United States Patent
Preisler et al.

(10) Patent No.: US 6,209,905 B1
(45) Date of Patent: Apr. 3, 2001

(54) AIR BAG COVER HAVING A FLEXIBLE DECORATIVE BADGE

(75) Inventors: Darius J. Preisler, Macomb; Jason T. Murar, Clinton Township, both of MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/483,140

(22) Filed: Jan. 13, 2000

Related U.S. Application Data (63) Continuation-in-part of application No. 09/144,315, filed on Aug. 31, 1998, and a continuation of application No. 09/226,497, filed on Jan. 7, 1999, now Pat. No. 6,053,526.

(51) Int. Cl.⁷ .................................................. B60R 21/16
(52) U.S. Cl. ........................................ 280/728.2; 280/731
(58) Field of Search ................................ 280/728.2, 731

(56) References Cited

U.S. PATENT DOCUMENTS

| | | |
|---|---|---|
| 4,139,664 | 2/1979 | Wenrick . |
| 4,292,827 | 10/1981 | Waugh . |
| 4,769,100 | 9/1988 | Short et al. . |
| 4,877,657 | 10/1989 | Yaver . |
| 4,902,557 | 2/1990 | Rohrbacher . |
| 4,934,735 | 6/1990 | Embach . |
| 4,952,351 | 8/1990 | Parker et al. . |
| 5,062,661 | 11/1991 | Winget . |
| 5,085,462 | 2/1992 | Gualtier . |
| 5,186,490 | 2/1993 | Adams et al. . |
| 5,198,629 | 3/1993 | Hayashi et al. . |
| 5,294,147 | 3/1994 | Edge . |
| 5,308,106 | 5/1994 | Heidorn . |
| 5,338,059 | 8/1994 | Inoue et al. . |
| 5,342,666 | 8/1994 | Ellison et al. . |
| 5,344,185 | 9/1994 | Cooke, II . |
| 5,369,232 | 11/1994 | Leonelli . |
| 5,371,333 | 12/1994 | Kanai et al. . |
| 5,463,258 | 10/1995 | Filion et al. . |
| 5,465,998 | 11/1995 | Davis . |
| 5,466,412 | 11/1995 | Parker et al. . |
| 5,487,557 | 1/1996 | Eckhout . |
| 5,499,841 | 3/1996 | Trojan et al. . |
| 5,529,336 | 6/1996 | Eckhout . |
| 5,542,694 | 8/1996 | Davis . |
| 5,549,323 | 8/1996 | Davis . |
| 5,558,364 | 9/1996 | Davis . |
| 5,569,893 | 10/1996 | Seymour . |
| 5,577,766 | 11/1996 | Niwa et al. . |
| 5,630,617 | 5/1997 | Hashiba . |
| 5,639,114 | 6/1997 | Margetak et al. . |
| 5,642,901 | 7/1997 | Bowman et al. . |
| 5,678,849 | 10/1997 | Davis . |
| 5,678,851 | 10/1997 | Saito et al. . |
| 5,685,056 | 11/1997 | Fischer . |
| 5,685,561 | 11/1997 | Kauer . |
| 5,725,241 | 3/1998 | Schenck . |
| 5,731,064 | 3/1998 | Suss . |
| 5,769,548 | 6/1998 | Thompson et al. . |
| 5,775,721 | 7/1998 | Grout . |

FOREIGN PATENT DOCUMENTS

| | | |
|---|---|---|
| 06091758 | 9/1992 | (JP) . |
| 07205536 | 1/1994 | (JP) . |

Primary Examiner—Kenneth R. Rice
(74) Attorney, Agent, or Firm—Brooks & Kushman P.C.

(57) ABSTRACT

An air bag cover assembly for a motor vehicle is provided and includes a plastic substrate which is adapted to enclose an uninflated automotive air bag and a switch. The substrate has an outer surface and an inner surface. The outer surface has a recessed portion defining therebehind a switch location area. Also included is a badge which is bonded to the substrate and includes a relatively soft plastic preform which is compatible with the substrate and a foil top layer. The badge is shaped correspondingly to be received in and secured to the recessed portion of the substrate. The badge also defines a switch interface for actuating the switch by applying pressure to the badge at it front outer surface.

15 Claims, 9 Drawing Sheets

AIR BAG COVER HAVING A FLEXIBLE DECORATIVE BADGE

CROSS-REFERENCE TO RELATED APPLICATIONS

This application is a continuation-in-part of U.S. Application Ser. Nos. 09/144,315 filed Aug. 31, 1998, and 09/226,497 filed Jan. 7, 1999 now U.S. Pat. No. 6,053,526.

TECHNICAL FIELD

This invention relates to a plastic air bag cover having a flexible decorative badge attached thereto and methods of making same.

BACKGROUND ART

Conventional air bag covers used in conjunction with occupant restraint systems may sometimes include decorative badges or ornaments attached thereto which are either formed integrally with or separate from the air bag cover. Such badges may take the form of a logo or mark representing a vehicle make, model, manufacturer, or the like. These decorative badges are aesthetically pleasing and help to enhance the overall appearance of the interior of the automotive vehicle. Since an air bag cover moves away from the steering column during inflation of the air bag, the associated decorative badge should be securely attached to the cover so that it does not come off during deployment and operation of the air bag.

Commonly, such decorative badges have an annular, symmetrical shape and are attached to the center of the air bag cover. Such badges may also be functional, and may for example be used as a horn interface on the air bag cover for actuating the automobile horn. More particularly, the switch for activating the horn is typically disposed in the area behind the decorative badge and therefore the badge must be depressed or otherwise be subjected to a force, however minimal, in order to activate the horn switch. Given the design of the badge and the types and thicknesses of materials used to form the badge, the horn switch may require relatively significant force in order to be actuated. Such relatively significant force may be required with badges having hard substrates or with metallic badges, such as those formed of aluminum having a decorative design painted or otherwise placed thereon.

Also, if the badge is other than a traditional annular badge, it may be difficult to maintain the attachment between the badge and the air bag cover across its contact area, particularly during horn actuation. In other words, for a relatively hard, non-annular badge, one or more portions of the badge may deflect upwards if another portion of the badge is depressed. Further, conventional air bag covers typically include annular or arcuate surfaces, and affixing the decorative badge to these designated surfaces may sometimes be difficult.

The prior art discloses various method of attaching an ornament to an air bag cover. For example, U.S. Pat. No. 5,678,851 to Saito discloses an air bag module cover which includes a cover member, an ornament on the cover member, and a rigid ornament-mounting structure including a fastener and a retainer. In one embodiment, a connecting film which fixes the ornament on the cover member has a membrane-type switch.

U.S. Pat. No. 5,529,336 and 5,487,557 issued to Eckhout disclose an air bag cover having a decorative applique fastened thereto. The decorative applique is disposed adjacent the tear seam in a non-overlapping fashion to prevent any interference with the inflation or exit of the air bag upon operation. The decorative applique includes a thin plastic layer extruded onto a decorative applique film. The decorative applique assembly is attached to the air bag cover by inserting connecting towers extending from the rear surface of the applique through fastening apertures which extend completely through the front cover of the air bag cover. A portion of the connecting tower extends out from the fastening aperture so that it may be deformed to form a retaining member larger in diameter than the fastening aperture so as to affix the applique to the air bag cover. The preferred method of deforming the portion includes applying a stream of heated air to the portion to melt the portion and then applying a cold stake directly to the melted portion to form the retaining member.

U.S. Pat. No. 4,139,664 issued to Wenrick discloses an elongated extruded strip adapted to be mechanically secured to a slotted sheet-like substrate. A thermoplastic material is continuously extruded in any desired cross-sectional configuration including a rear face having at least one rearwardly projecting rail. Longitudinally spaced apart sections of this rail are removed to provide longitudinally spaced rearwardly projecting teeth which enable mechanical securement of the extrusion to a supporting substrate having slots through which the teeth are extended.

U.S. Pat. No. 4,769,100 to Short teaches a method of applying a carrier film pre-printed with metallic paint to an automobile body panel in a vacuum forming process.

While the prior art has addressed the attachment issue in various forms, there still exists a need for an inexpensive and simple method of making an air bag cover having a decorative badge secured thereto, particularly for a badge which is non-annular. The badge should be fastened to the air bag cover across its surface area in a secure manner and should accommodate deflection when force is exerted upon it. The badge should permit actuation of switches located behind the badge without significant force. The badge should be fastened to the air bag cover by a method that allows a smooth surface and neat appearance. In addition, the badge should be affixed to the cover in such a way as to prevent it from separating from the front cover when the air bag deploys.

DISCLOSURE OF THE INVENTION

An object of the present invention is to provide a flexible badge for an air bag cover.

It is thus a general object of the present invention to provide an air bag cover having a flexible decorative badge secured thereto and a simple, inexpensive method of making same.

It is another object according to the present invention to provide an air bag cover having a decorative badge which is non-annular, non-symmetrical, and/or elongate in shape and design.

It is still another object according to the present invention to provide an air bag cover having a decorative badge which acts as a switch interface, such that the switch interface does not require significant force to actuate.

It is yet another object according to the present invention to provide a badge for an air bag cover which has the durability and strength necessary to support varying applications yet comply with styling and aesthetic requirements.

It is another object according to the present invention to provide a multiple-component badge that is assembled together and then assembled with the air bag cover.

In carrying out the above object and other objects of the present invention, a flexible decorative badge for an air bag cover is provided. The flexible badge is preferably a foil-covered plastic part. The foil-covered plastic part also includes a hot stamping foil having a foil top layer disposed on a plastic bottom layer which, in turn, is bonded to an outer surface of the at least one foil-receiving portion to form the automotive interior foil-covered plastic part. The resulting part has an aesthetically pleasing appearance. In one embodiment, the foil layer is a chrome layer.

More particularly, the present invention provides an air bag cover assembly which is adapted for mounting on a motor vehicle. The air bag cover assembly includes a plastic substrate which is adapted to enclose an uninflated automotive air bag and a switch. The substrate has an outer surface and an inner surface. The outer surface has a recessed portion which defines therebehind a switch location area. The air bag cover assembly also includes a badge which is bonded to the substrate and includes a relatively soft plastic preform which is compatible with the substrate and a foil top layer. The badge is shaped correspondingly to be received in and secured to, preferably permanently, to the recessed portion of the substrate and defines a switch interface for actuating the switch. The actuation occurs by applying pressure to the badge at it front outer surface. In various embodiments, the preform has a relatively elongated shape, an unsymmetrical shape, or a non-annular shape.

In another embodiment, the preform and the foil top layer are compatible so that diffusion occurs therebetween, and the top foil layer is a chrome layer. The assembly may also include a switch disposed behind the inner surface of the badge, where the switch is actuable by applying relatively low pressure to the badge outer surface. In still another embodiment, the badge has at least one tab which extends through a corresponding slot in the substrate which has a bent portion which presses against the inner surface of the substrate so as to create a constant load on the substrate, such that the substrate exerts an opposing reaction to the constant load thereby allowing the badge to be secured to the substrate. The bent portion of the tab may extend inwardly toward a center of the substrate, or outwardly.

In keeping with the present invention, also provided is an air bag cover assembly for a motor vehicle which includes a plastic substrate which is adapted to enclose an uninflated automotive air bag and a switch. The substrate has an outer surface, an inner surface, and a tear seam formed in the surface of the substrate for allowing the air bag to deploy. The outer surface has a recessed portion disposed in a non-overlapping manner with the tear seam and defines therebehind a switch location area. Also included is a badge portion which is bonded to the substrate and includes a relatively soft plastic preform which is compatible with the substrate and a foil top layer. The badge portion is correspondingly shaped to be received in and attached to the recessed portion of the substrate and defines a switch interface adapted to actuate the switch by applying pressure to the badge at its front outer surface.

Also provided in accordance with the present invention is a method for making an air bag cover having a decorative badge secured thereto. The method includes providing a film sheet, vacuum molding the film sheet in a mold cavity to obtain a relatively soft decorative preform, and providing a hot stamping foil having a foil top layer and aligning the hot stamping foil with the preform in a hot stamping machine. The method also includes operating the hot stamping machine for a time sufficient to generate a temperature and a pressure sufficient to melt and combine a top surface of the at least one foil-receiving portion and the preform of the hot stamping foil to form the decorative badge. The method further includes injection molding a thermoplastic elastomeric body having a shape defining the air bag cover, and also bonding the decorative badge to the air bag cover.

In one embodiment of the above method, injection molding includes placing the foil covered badge in an injection mold cavity having a shape defining the air bag cover. Injection molding further includes injecting a thermoplastic elastomer into the mold cavity to generate a substrate of the air bag cover wherein the generation of the substrate of the air bag cover creates sufficient pressure and heat to bond the substrate to the bottom surface of foil-covered badge. In yet another embodiment, the badge has at least one tab projecting therefrom opposite the foil top layer, and the step of bonding includes inserting the tab through a corresponding aperture in the air bag cover and bending the tab to secure the badge to the air bag cover.

Some advantages of hot stamping are (1) Dry decorating method because there is no clean-up required with hot stamping. A hot stamped part is immediately ready for handling and packaging. (2) A variety of materials can be decorated using the hot stamping process, most commonly thermoplastics, but also thermosets, wood, book cloth, leather, textiles, paper, cardboard and pre-painted metals are stamped with great success. (3) Hot stamping provides a decorative method where permanent gold and silver metallic graphics can be produced, as well as foils in gloss or matte pigment colors, wood grain designs, brushed effects, and chromium for exterior use. Multi-colored graphics can also be accomplished with pre-printed heat transfers and continuous patterned foils. (4) Hot stamp foils can be applied to a variety of surface geometries including flat, cylindrical and spherical shaped parts along with raised beads graphics. (5) There is minimum set-up time and changing the stamping color simply involves changing a dry roll of hot stamp foil. (6) Hot stamping foil has excellent adhesion and permanency and abrasion resistance due to thermal bonding that takes place. (7) With hot stamping, there are no EPA or fire safety considerations to be concerned about. Hot stamping, unlike other decorating methods, does not require any special storage, insurance or removal of hazardous solvents or vapors.

Further, another embodiment according to the present invention is directed to a multiple-component badge assembly (preferably two components such as a main body portion and an emblem insert) which is attached to an air bag cover, and the method of forming the same.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 14b is a side elevational view of the main body portion of the badge of FIG. 14a;

FIG. 15a is a top plan view of an emblem portion of the badge of FIG. 1;

FIG. 15b is a sectional view taken along line 15b–15b of FIG. 15a;

FIG. 15c is a sectional view taken along line 15c–15c of FIG. 15a;

BEST MODE FOR CARRYING OUT THE INVENTION

Figure 1:
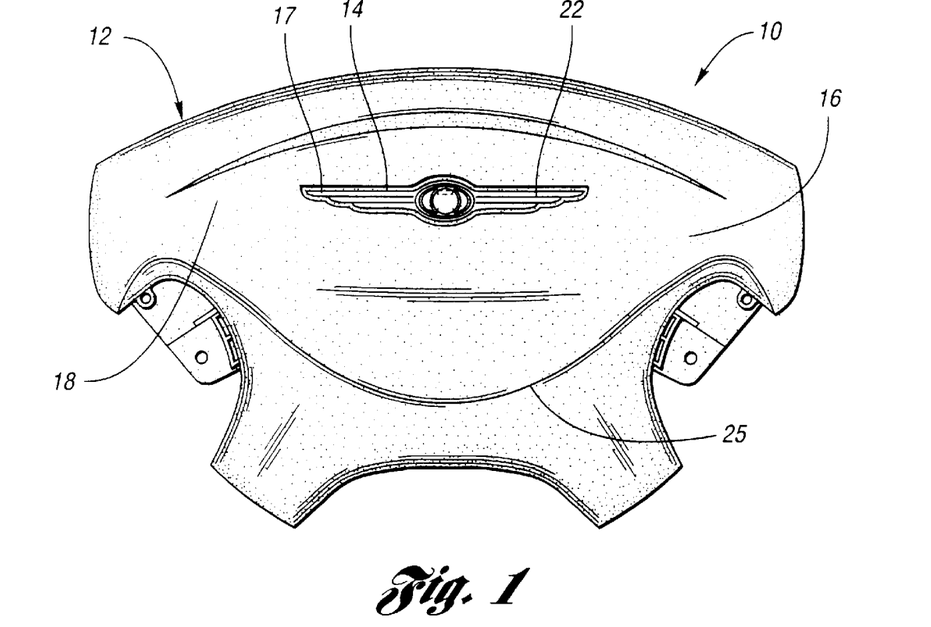
FIG. 1 illustrates a front elevational view of an air bag cover according to the present invention having a decorative badge secured thereto.
Figure 3:
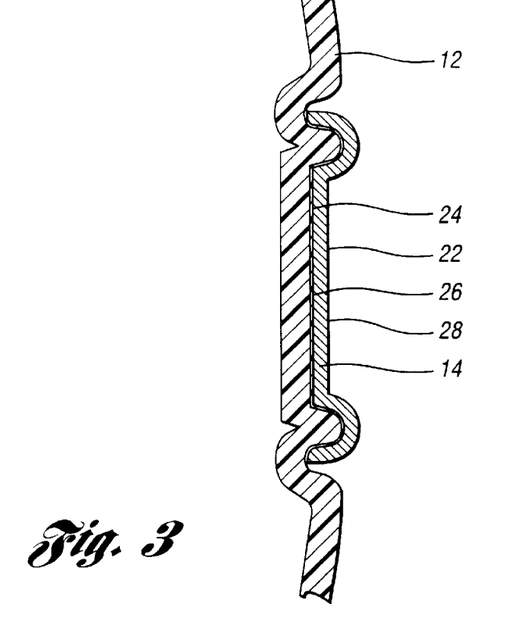
FIG. 3 is a cross-sectional view taken along line 3—3 of FIG. 2, with particular focus on the badge attachment area.

With reference to FIG. 1 of the drawings, illustrated therein is an automotive interior air bag cover assembly 10 constructed in accordance with the present invention. Air bag cover assembly 10 is shown as the type adapted for mounting to a steering wheel assembly. Air bag cover assembly 10 includes an air bag cover 12 and a flexible badge 14 which is bonded to a front panel 16 of cover 12. Front panel 16 has an arcuate front outer surface 18 and a rear inner surface 20 (as shown in FIG. 3). Badge 14 serves to enhance the appearance of air bag cover assembly 10, while air bag covers are generally designed to accommodate the overall appearance of the inside of the particular automobile. Thus, the teachings according to the present invention allows for the enhanced appearance of badge 14 while retaining the functional aspects of air bag cover 12.

Figure 2:
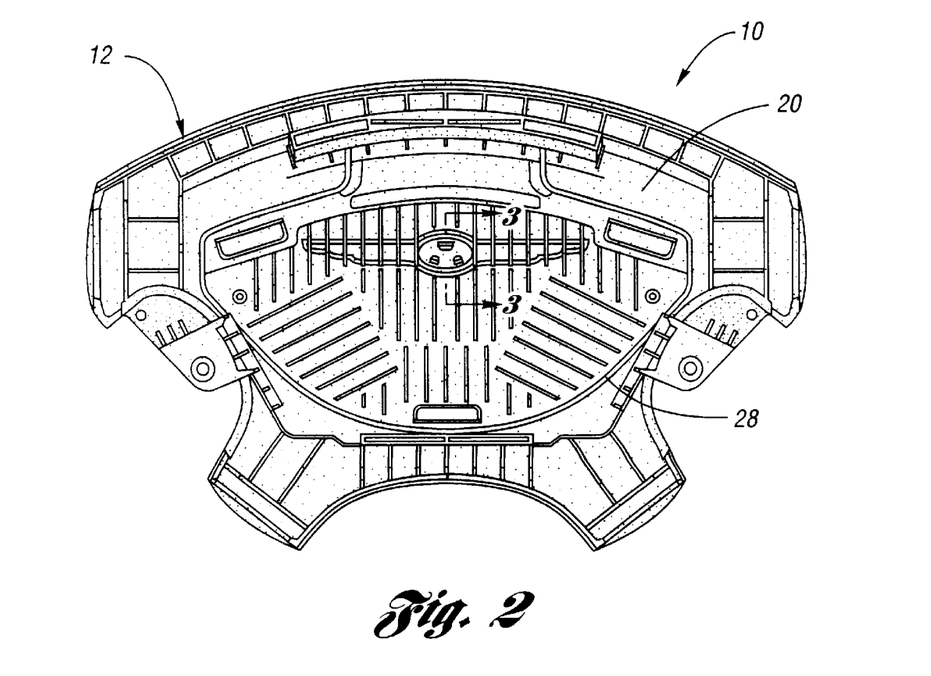
FIG. 2 illustrates a rear elevational view of the air bag cover shown in FIG. 1.
Figure 4:
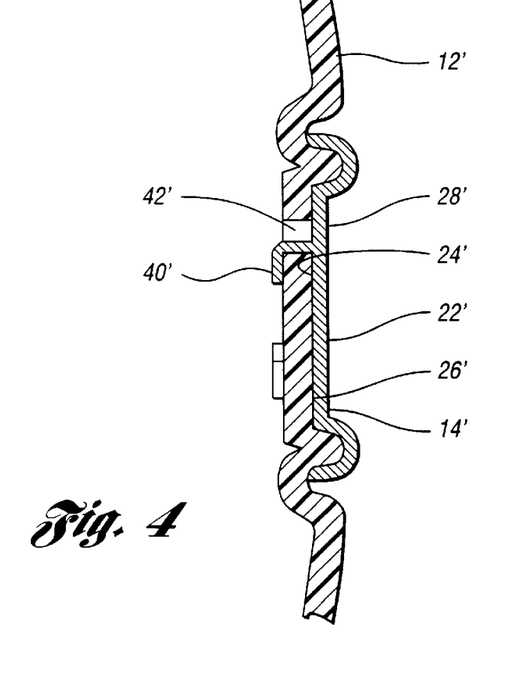
FIG. 4 is an alternative cross-sectional view taken along line 3—3 of FIG. 2, showing a different form of attaching the badge to the air bag cover.

Badge 14 has a front outer surface 22 and a rear inner surface 24 (see FIG. 3). As illustrated in FIGS. 2, 3, and 4, badge 14 is received in a correspondingly sized and shaped outer recessed portion 26 (FIG. 6) of front surface 18, and is preferably permanently fastened therein.

Air bag cover 12 is preferably formed from a thermoplastic elastomer, and for example is formed from a thermoplastic polyolefin, thermoplastic urethane, polyester, polycarbonate, a mixture of polycarbonate and ABS (acrylonitrile/butadiene/styrene) or similar material. Air bag cover 12 may also be formed from thermoplastic polyolefin, polycarbonate, tee tpe, sebs tpe, and a mixture of polycarbonate and ABS. Further, air bag cover 12 may be manufactured from a flexible thermoplastic material such as commercially available "Santoprene" 201-87 supplied by Advanced Elastomers Systems of Auburn Hills, Mich. Air bag cover 12 is preferably formed utilizing any conventional injection molding process.

The durometer and elastic or flex modulus of air bag cover 12 may vary depending on the desired stiffness of the component. Typically, the durometer of front panel 16 is in the range of approximately 20 to 100 Shore D, while the flexural modulus is in the range of approximately 15,000 to 400,000 psi. These ranges of course vary depending on the particular air bag cover to be manufactured and are only illustrative of one example.

A continuous tear seam 25 extends around the perimeter of, and across, inner surface 20 of air bag cover 12 (see FIGS. 1 and 2). An uninflated air bag (not shown) is located adjacent inner surface 20 of cover 12. Air bag cover 12 is designed to enclose the uninflated air bag and is usually positioned upon a steering wheel (not shown) of the automotive vehicle.

Figure 6:
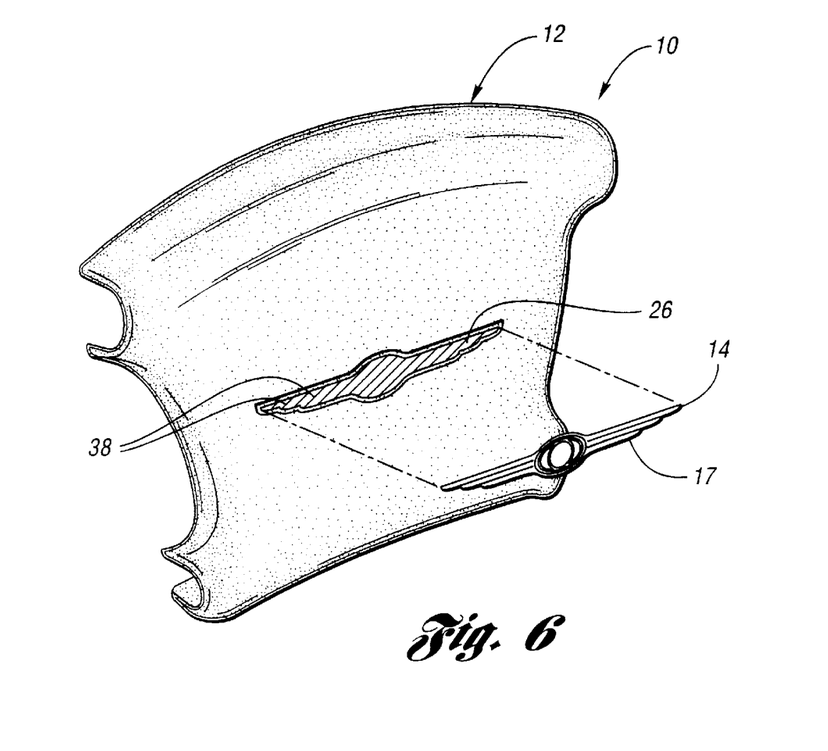
FIG. 6 is another front perspective view of the air bag cover according to the present invention and similar to the view shown in FIG. 5, showing the recess and decorative badge separated therefrom for illustrative purposes.

Referring to FIG. 6, illustrated another perspective view of of air bag cover assembly 10 in a disassembled state, with badge 14 shown as separated from air bag cover 12. Air bag cover assembly 10 includes badge 14 having a one-piece preform 13, a film sheet preferably formed of polyester such as Mylar®, a polyurethane or polycarbonate sheet. Preform 13 is preferably formed by a vacuum molding process from a material compatible with air bag cover 14, or by any other process applicable and feasible to manufacturing the component. The elastomeric material from which air bag cover 12 is formed should be compatible with preform 13 so that a bottom contact surface of preform 13, bonds with the front contact surface of air bag cover 12 by diffusion between the surfaces thereof to prevent air bag cover 12 from separating from preform 13 during use of the air bag cover 12. Preform 13 is typically a thin and relatively soft membrane composite having a thickness of less than 0.5 millimeters.

Figure 5:
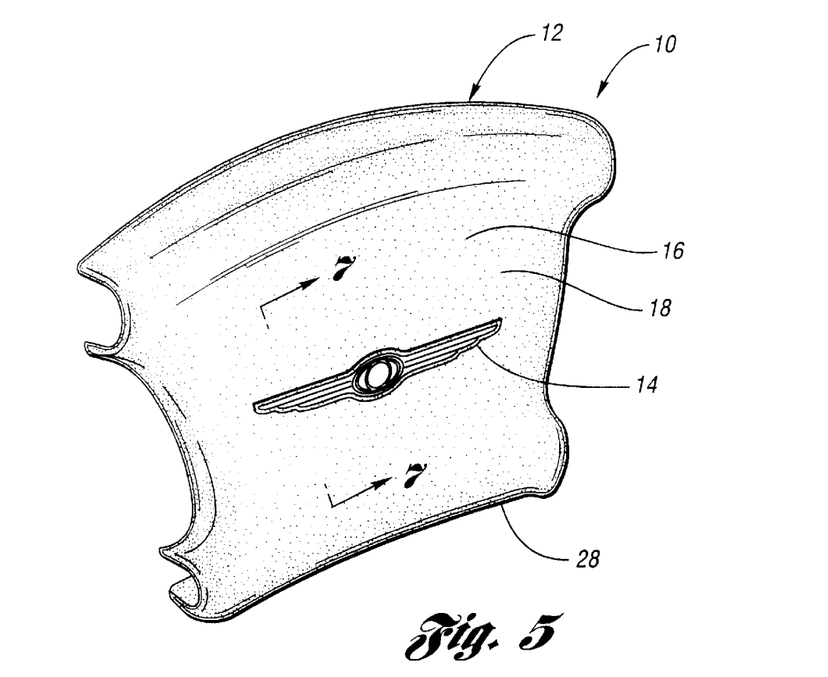
FIG. 5 is a front perspective view of an air bag cover according to the present invention having a decorative badge secured thereto.
Figure 7:
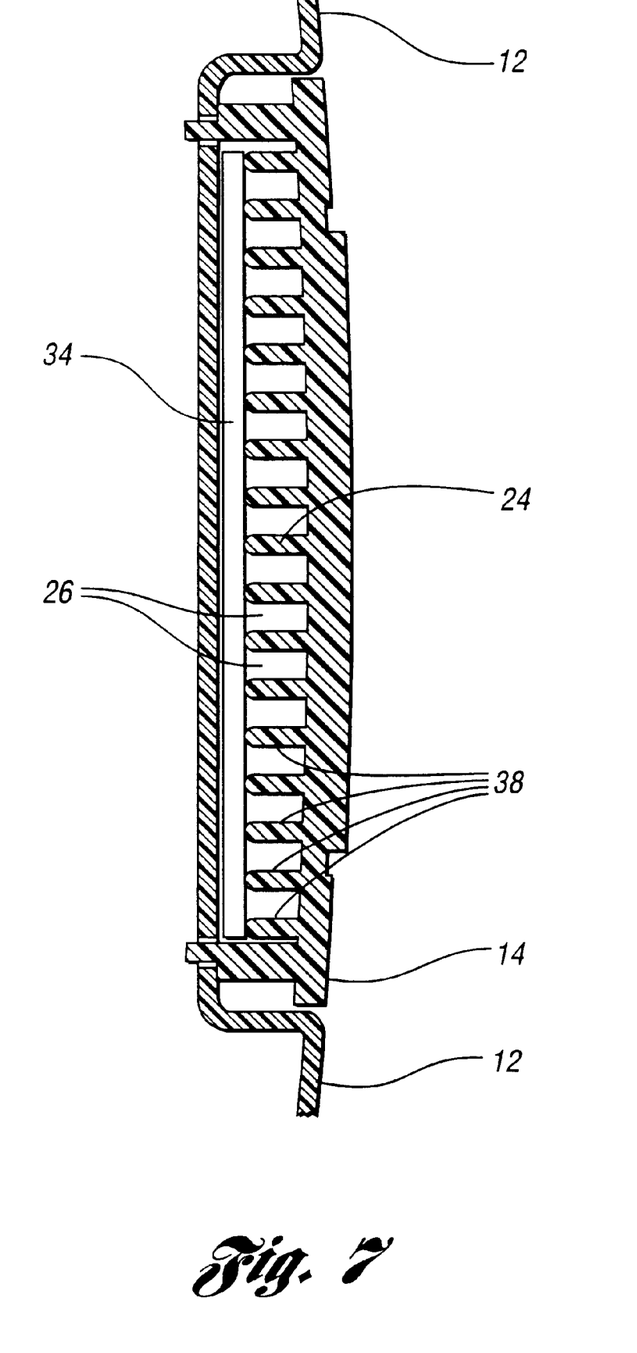
FIG. 7 is cross-sectional view of the air bag cover shown in FIG. 1 taken along reference lines 7—7 of FIG. 5 and showing a switch in the recessed area.

FIG. 7 illustrates a cross-sectional view of air bag cover assembly 10 of FIG. 5 taken along line 7—7. Air bag cover substrate 12 supports badge 14 in recessed portion 26. Badge 14 has a pre-painted coating placed thereon, followed by a base coat, preferably a layer of acrylic color, and a clear coat, preferably an acrylic clear coat to protect the film from damage and to provide film elasticity, chemical resistance, stain resistance, weathering and UV protection, and a layer of PVDF. Badge 14 is a relatively soft and flexible decorative applique having a layer of foil or plastic film 28 defining an outer surface 22 of badge 14.

As also shown in FIG. 3, badge 14 may include a hot stamping foil, generally indicated at 28, includes a foil top layer 30 disposed on a plastic bottom layer 32. Outer surface of foil may be chromed or silvered surface, a wood grain simulated surface, or a textured surface. Plastic bottom layer 32, which may be a polyester film layer, is bonded to the plastic outer surface of preform 13. In other words, the plastic bottom layer 32 bonds with the acrylic clear coat and the layer of PVDF of preform 13.

The features of the preform components or layers are 1) a stiff inner material to support the intended application; 2)

reduction and/or elimination of pain problems such as drips, rims, spits, dry spray, light coverage and gloss and improved color match and paint adhesion; 3) reduced molding scrap due to spray, flow marks and minor surface imperfections, which can be completely covered; and 4) increase durability of the resulting plastic laminate components.

Referring again to FIGS. 1 and 6, badge 14 is shown bonded to air bag cover 12. FIGS. 1 and 2 illustrate that badge 14 is disposed adjacent the tear seam 25 in a non-overlapping fashion to prevent any interference of badge 14 with inflation or exit of the air bag upon operation. Badge 14 is therefore located sufficiently away from tear seam 25 such that the attendant explosive effect that occurs upon inflation and exit of the air bag to separate cover 12 at tear seam 25. Tear seam 25 is of a reduced thickness to permit the air bag, as it is inflating, to exert a force at a lower portion of the front panel to cause the front surface 18 to separate along tear seam 25. Tear seam 25 is therefore designed to be the primary, or sole, break-away area of air bag cover 12 during inflation and exit of the air bag.

As illustrated in FIGS. 5–7, the teachings according to the present invention are particularly applicable to a driver's side air bag cover assembly 10 which has a switch, typically a horn switch 34 located behind air bag cover 12 and disposed behind badge 14 such that depression 26 of the front surface of air bag cover 12 in the area of badge 14 defines a horn interface area for actuating horn switch 34. Accordingly, when badge 14 is depressed or subjected to some amount of force, the flexibility of badge 14 allows horn switch 34 to be readily actuated, while badge 14 remains securely fastened to air bag cover 12.

Switch 34 lies behind the rear inner surface of the badge 14 within a recessed portion 26 (i.e., FIG. 6) in the switch activation area. Switch 34 includes electrical leads (not shown) adapted to communicate with the vehicle's electrical system. Exerting load or pressure on outer surface 20 of the badge 14 at the switch activation area is transmitted initially by badge 14 to the distal ends of ribs 36, and then by ribs 36 to activate switch 32.

In the embodiment illustrated in FIGS. 5–7, rear inner surface 24 of badge 14 includes a plurality switch activating members 36 integrally formed therein projecting rearwardly therefrom, such that switch activating members 38 enhance activation of switch 34. FIG. 7 is a cross-sectional view taken along the line 7—7 of FIG. 6. Switch activating members 36 are illustrated in FIG. 2 as ribs. Switch activating members 36 may be integrally formed in the shape of small circles, ribs, raised dots, X's, etc. as illustrated in U.S. Pat. No. 5,642,901.

Figure 13:
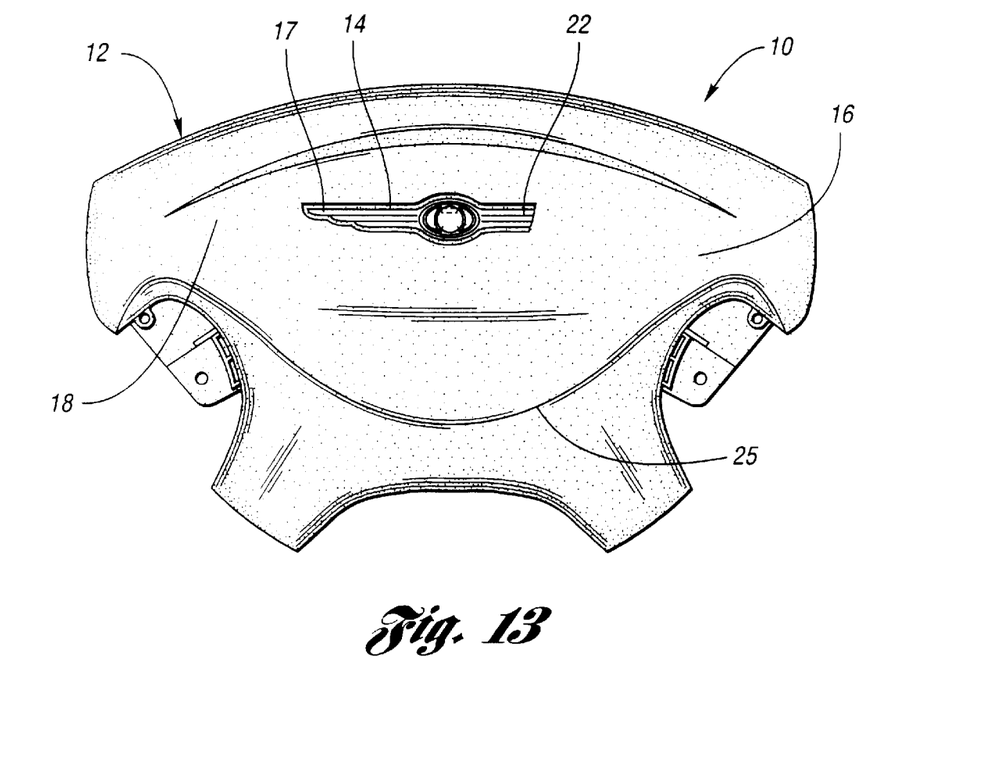
FIG. 13 illustrates an unsymmetrical badge according to the present invention.

The teachings according to the present invention are particularly applicable to badge 14 which has an elongated and non-annular shape, as illustrated in FIGS. 1–2 and which may also be unsymmetrical as shown in FIGS. 5–6 as badge 14. When depressed at one portion, a badge having an elongated or non-annular shape and formed by a process or material different than those disclosed herein may deflect at another portion. Such is often the case with badges having hard substrates or metallic badges, such as those formed of aluminum having a decorative design painted or otherwise placed thereon. The present invention may also be applicable to a badge 114 which is unsymmetrical, as illustrated in FIG. 13. Of course, it is contemplated that various shapes of badge 14 are well suited for the present invention including, and that such shapes are limited only by its application, size, and imagination.

Badge 14 can be fixedly secured to front panel 16 by the bonding process illustrated in U.S. Pat. No. 5,685,561. In this process, strips of a thermoplastic electromagnetic material, such as an EMAWELD® material, are positioned in channels formed between the outer recessed portion 26 and the outer peripheral edge of badge 14, and an electromagnetic field is then established about the EMAWELD® material positioned in the channels for a time sufficient to melt the material which, in turn, melts surface layers of the outer peripheral edge and outer recessed portion 26.

In another embodiment, FIG. 4 illustrates an alternate form of attaching or bonding badge 14' to cover 10'. Note that reference numbers correspond to those in the embodiment of FIGS. 1–3 and 5–7, with the addition of a prime (') designation. Referring to FIG. 4, badge 14' may include at least one tab member 40', and preferably a plurality of tabs 40' which are bent against a rear surface 20' of cover 12'. Badge 14' is secured to the panel 12' by inserting tabs 40' through corresponding slots 42' formed in cover 12' and extending between front and rear surfaces of recessed portion 26'. Tabs 40' are then bent against the rear surface of recessed portion 26' as illustrated in FIG. 4. Bent tabs 40' press against the rear surface of recessed portion 26' to create a substantially constant load on the elastomeric material of cover panel 12'. In reaction to this load, the elastomeric material of cover panel 12' exerts an opposing reaction (spring-like force) which allows badge 14' to be secured to cover panel 12'.

Preferably, tabs 40' are bent inwardly toward a center of recessed portion 26' as in FIG. 4, which takes up less space on the rear surface of recessed portion 26', and also allows ornament badge 14' to aid in creating a greater force exerted by the elastomeric material due to the sandwich effect of badge 14' and tabs 40'. Alternatively, tabs 40' could be bent outwardly away from the center of recessed portion 26'. Tabs 40' are preferably rectangular in shape and preferably have a length of approximately 11 mm, a width of approximately 7 mm, and a thickness of approximately 0.5–0.7 mm. Furthermore, although the tabs 40' are shown extending from an outer periphery of ornament 14', tabs 40' may alternatively extend from a center portion of badge 14'. In the latter case, it is preferred that the tabs 48 bend outwardly against the rear surface of cover 12'.

Figure 12:
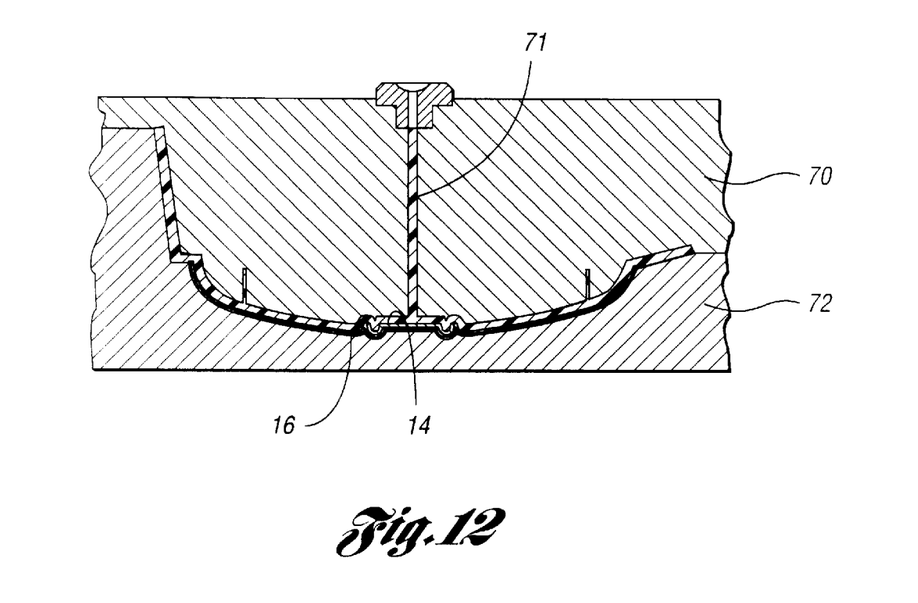
FIG. 12 is a schematic view of a conventional injection molding system showing the mold cavity with the molten resin injected therein to form the substrate for the preform, according to the present invention.

Yet another form of bonding badge 14 to air bag cover 12 is illustrated in FIG. 12, wherein the badge is placed in an injection mold cavity having a shape defining the air bag cover. The badge is specifically placed in a mold recess for retaining badge 14 during this process. Then a thermoplastic elastomer 71 is introduced into the injection mold cavity to generate a substrate of air bag cover 12 wherein the generation of the substrate of the air bag cover 12 creates sufficient pressure and heat to bond the substrate 12 to the bottom surface of foil-covered badge 14. Illustrated in FIG. 12 is badge 14 which includes preform 13 created from the vacuum molded film sheet which is first placed in the injection mold cavity. Thereafter, as depicted in FIG. 12, air bag body cover 12 is molded in the plastic injection molding system molds with mold halves 70 and 72 to form a completed unitary air bag cover and badge 10.

Figure 8:
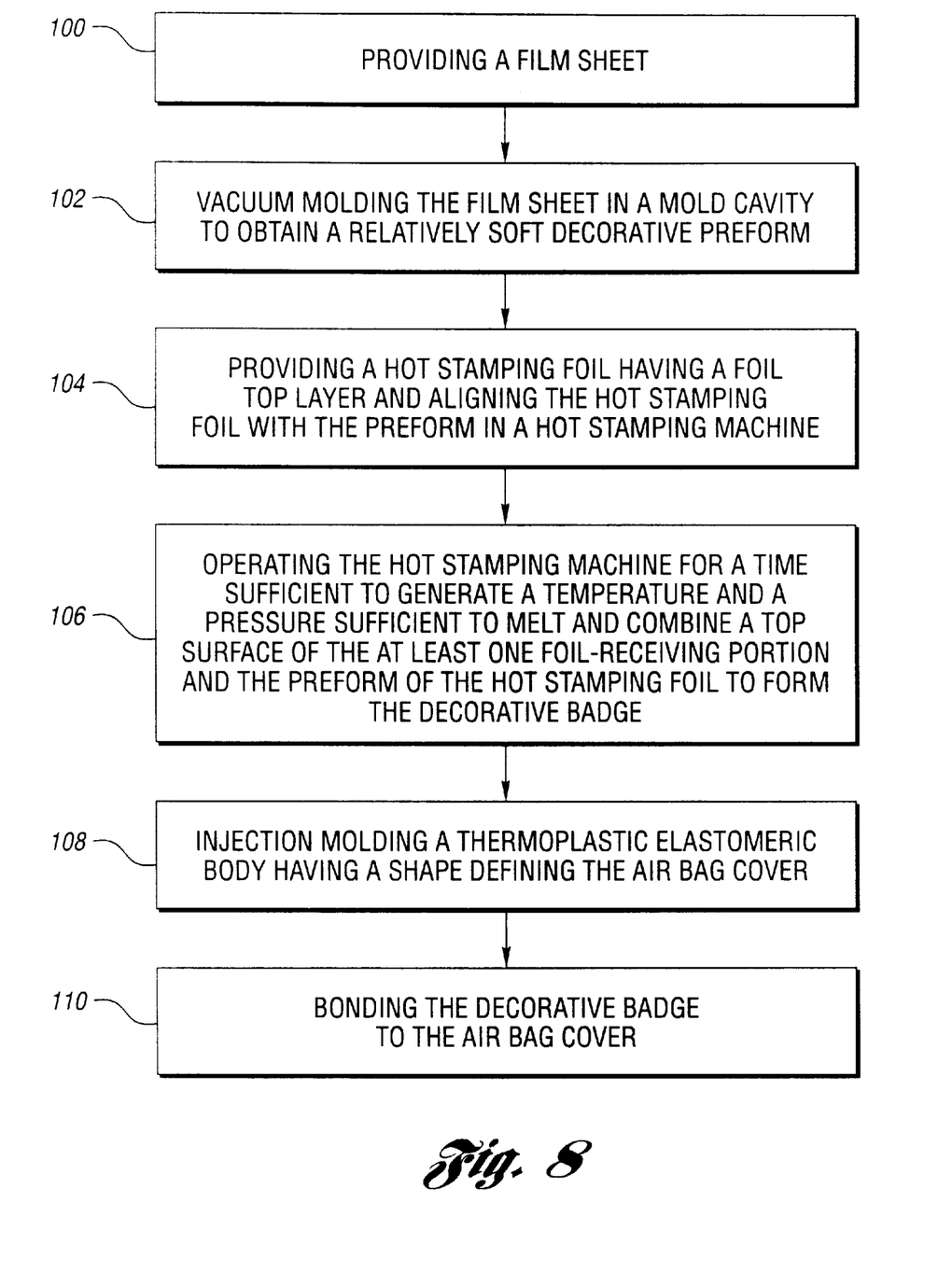
FIG. 8 is a block diagram flow chart illustrating the method of forming the badge in accordance with the present invention.

Referring now to FIG. 8, there is illustrated in block diagram flow chart form various method steps for forming the air bag cover 10 of the present invention. At block 100, a film sheet, preferably of foil, is provided. At block 102, the foil film sheet is placed in a vacuum mold which is operated to form a relatively soft preform. At block 104, a hot stamping foil is provided having a foil top layer and aligning the hot stamping foil with the preform in a hot stamping machine. At block 106, the hot stamping machine is operated for a time sufficient to generate a temperature and a pressure sufficient to melt and combine a top surface of the preform of the hot stamping foil to form the decorative badge. At block 108, a thermoplastic elastomeric body is molded having a shape defining the air bag cover. At block 110, the decorative badge is bonded to the air bag cover.

Figure 9:
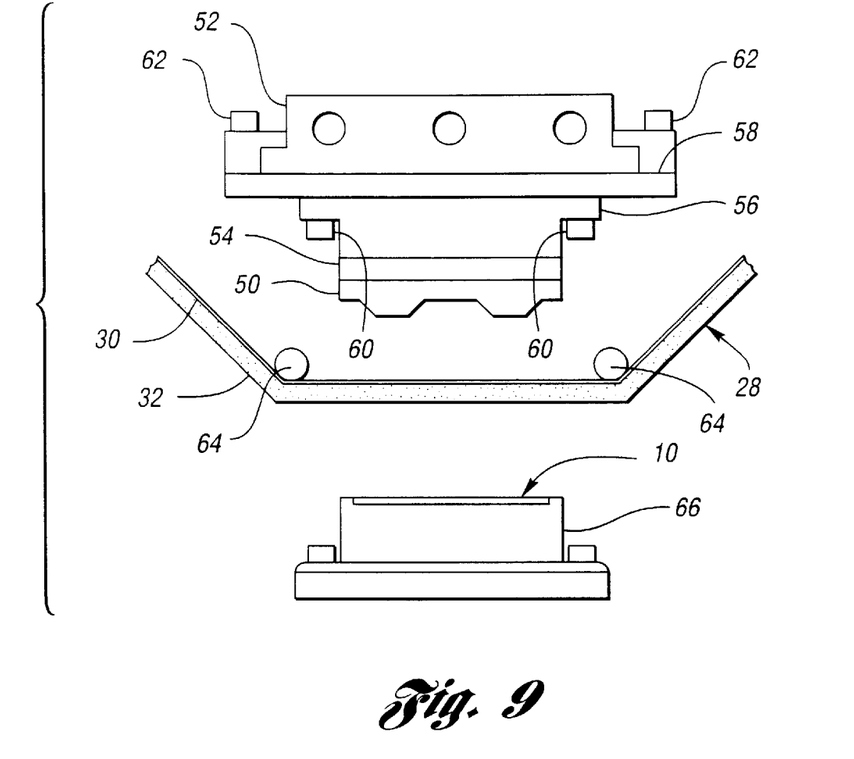
FIG. 9 is a side schematic view of a hot stamping machine in a vertical stamping set up.

Referring now to FIG. 9, illustrated are parts of a hot stamping machine for use in foiling the badge 14 of the present invention. In the thermoplastic foil, vertical stamping arrangement illustrated in FIG. 9, a silicone rubber die 50 is mounted to an aluminum backing plate 54 which, in turn, is mounted to a die mounting block 56 which, in turn, is mounted to a die mounting plate 58 by means of bolts 60 which, in turn, is mounted to a heater head by bolts 62. The silicone die 50 consists of heat stable silicon rubber available in a wide range of hardness (durometer) bonded to the aluminum packing plate 54. The graphics illustrated in FIG. 1 which are to be stamped such as the raise "wings" 17 are lowered on the die surface a minimum of 1/32 and are heated to a temperature near the melting point of the plastic layer 13, usually in excess of 300° F. Centered directly below the silicone die 50 in a path defined by two stripper bars 64 is hot stamp foil 28 consisting of one or more thin coatings such as the plastic bottom layer 13 deposited on a film carrier in the form of foil top layer 30. Typically, there is approximately ½ inch space between foil top layer 30 and the hot die face of silicone die 50 so that the release characteristics of hot stamping foil 28 and the hot die face of silicone die 50 are affected as little as possible by heating convection. Supported directly below the silicone die 50 and hot stamping foil 28 aligned a part holding fixture 66 which supports air bag cover 12 so that the raised graphic design (i.e., wings 17) formed thereon is aligned within ¼ to 1/10 of a millimeter with the graphics formed on the face of silicone die 50.

Figure 10A:
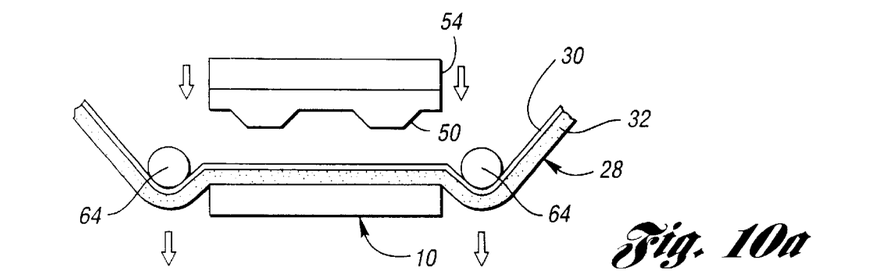
FIGS. 10a–10e are side schematic views illustrating the various steps taken by the hot stamping machine of FIG. 9 in order to cover portions of a plastic part with foil.
Figure 10B:
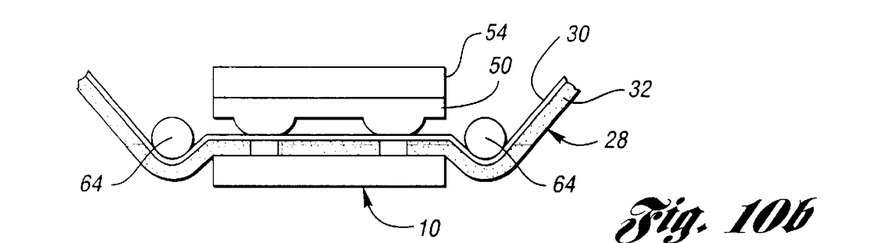

Referring now to FIGS. 10a–10e, there are illustrated the various steps taken in the hot stamping machine to make foil-covered badge 14. With particular reference to FIG. 10a, when the machine sequence has been initiated, silicone die 50 and its aluminum backing plate 54 are sent toward the foil-receiving surface of preform 13 to be decorated. Foil 28 travels with die 50 and, at the same time, maintains its distance from the die face. Foil 28 contacts preform first and the stripper bars 64 act to push foil 28 tightly over the surfaces of the raised design portions (i.e. wings 17) to remove any wrinkles. Referring now to FIG. 10b, a fraction of a second after foil 28 is pushed over badge 14, the hot stamp die surface of die 50 makes contact simultaneously with foil 28 and the rigidly supported plastic part badge 14. The pressure that is exerted accomplishes two things. First, the silicone rubber of die 50 compresses and conforms to any small surface variation in the part decorating area (i.e., the decorative surface portion or wings 17) so that even contact is achieved. Second, the foil resins together with the corresponding portions of foil top layer 30 in the graphic area will break cleanly creating a parting line.

Figure 10C:
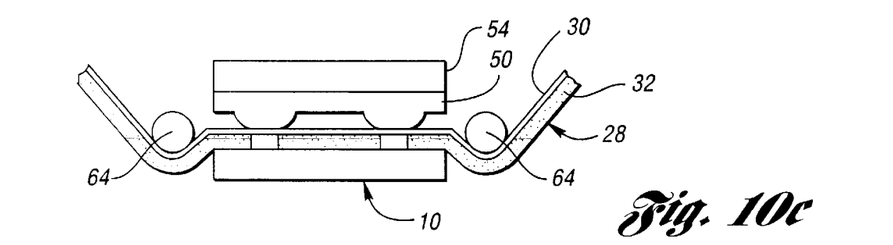
Figure 10D:
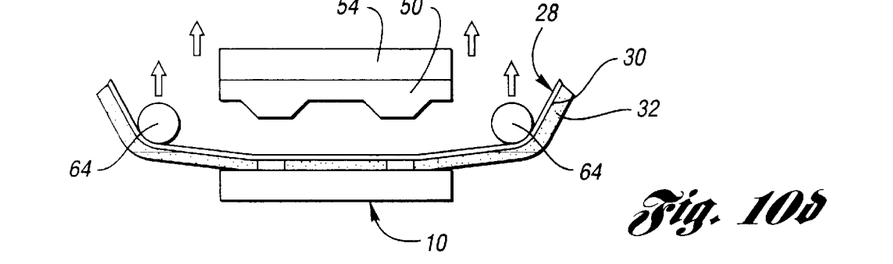

Referring now to FIG. 10c, during the dwell time illustrated in FIG. 10c, the period that hot die 50 is in contact with foil 28 and badge 14, heat conduction causes the release agents and resins of foil 28 to soften. At the same time, the acrylic clear coat and layer of PVDF begins to soften and the pressure exerted by the hot stamping machine helps the resins of the plastic bottom layer of preform 13 penetrate the molten plastic of the preform top layer to promote thermal bonding. Referring now to FIG. 10d, at the end of the dwell time, the head of the machine, including silicone die 50 and aluminum backing plate 54, retracts and begins its ascent to its start position. First, die 50 moves away from badge 14 while foil 28 remains on the surface for a split second, allowing foil 28 to cool and plasticize. Then as die 50 continues to rise, portions of foil 28 over the raised graphics are peeled away from the rest of foil 28. At this point, adhesion between badge 14 and the portions of the foil coatings is greater than the bond between the release agents in the coatings and the rest of foil 28 resulting in virtual complete deposition of the foil coatings over wings 17.

Figure 10E:
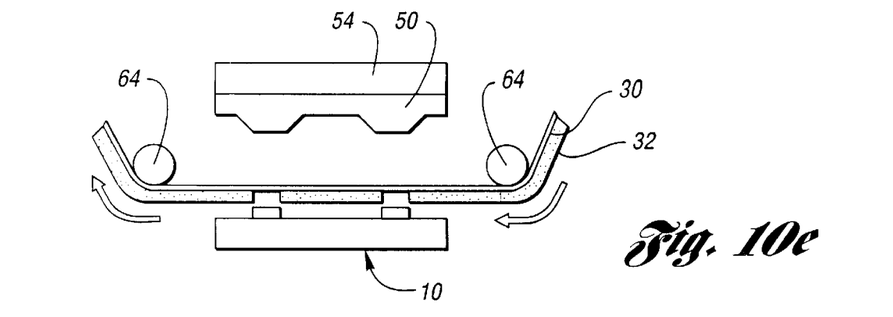

Referring now to FIG. 10e, as soon as the head of the machine, including die 50, returns to its original position, foil 28 advances and an unused section will be positioned under die 50. Badge 14 can be removed from the fixture 46 and handled or packaged as necessary without any danger of rubbing the foil off the decorative portions of preform 13.

Figure 11:
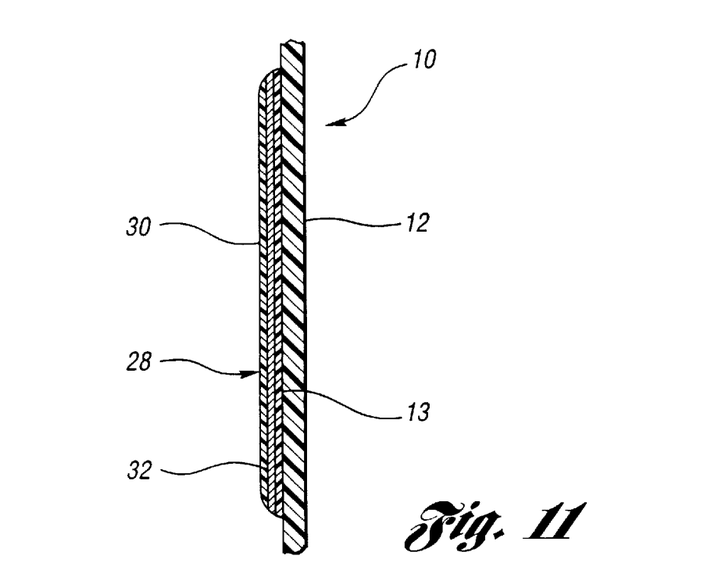
FIG. 11 is a schematic cross-sectional view similar to FIG. 7.

As illustrated in the simplified schematic cross-sectional view of FIG. 11, a sectional view of air bag cover assembly 10 similar to FIG. 7 is shown. Air bag body substrate 12 supports preform 13 which has a pre-painted coating placed thereon, followed by a base coat, preferably a layer of acrylic color, and a clear coat, preferably an acrylic clear coat and a layer of PVDF as previously shown. As also shown in FIG. 11, hot stamping foil, generally indicated at 28, includes foil top layer 30 disposed on plastic bottom layer 32. Plastic bottom layer 32, which may be a polyester film layer, is bonded to raised decorative indicia (i.e. wings 17) on the plastic outer surface of preform 13. In other words, plastic bottom layer 20 bonds with the acrylic clear coat and the layer of PVDF at raised surface portions of preform 13.

Figure 14A:
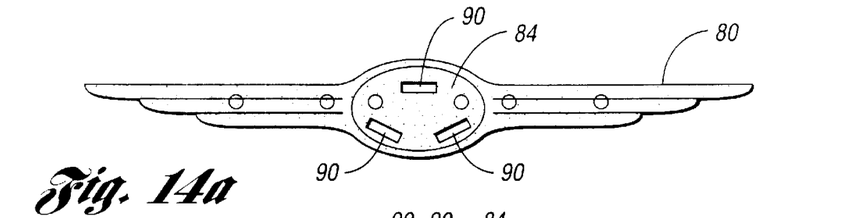
FIG. 14a is a top plan view of a main body portion of the badge of FIG. 1.
Figure 14B:
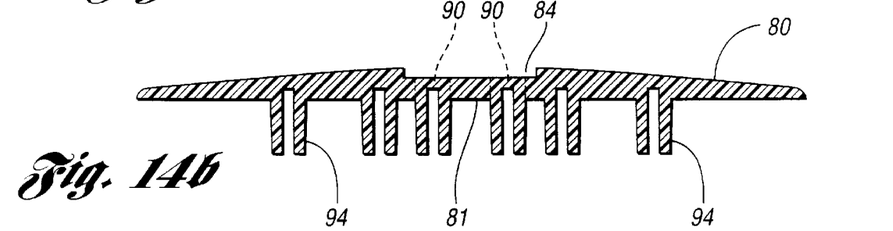
Figures 15A, 15B, 15C:
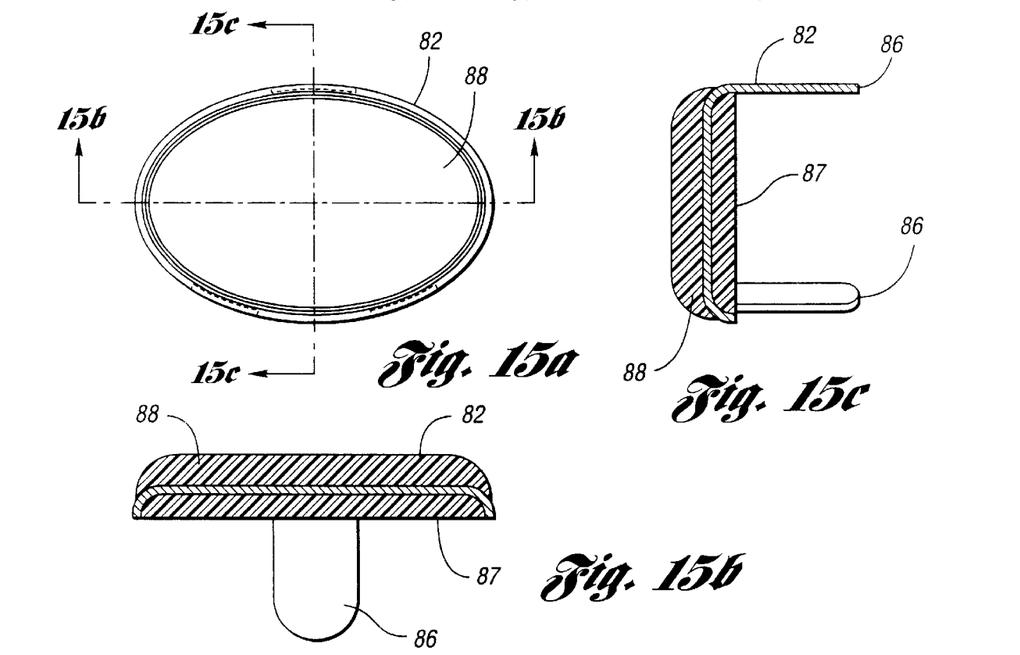
Figure 16A:
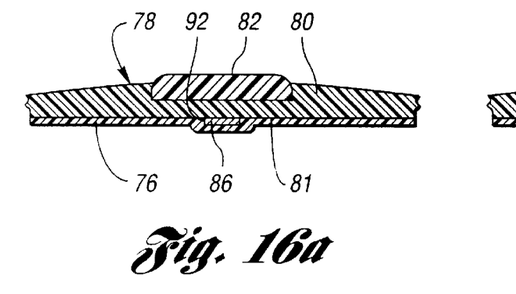
FIG. 16a is a schematic illustration showing a first embodiment of the badge assembly of the emblem and badge main body portion of FIGS. 14–15, with the air bag cover substrate.
Figure 16B:
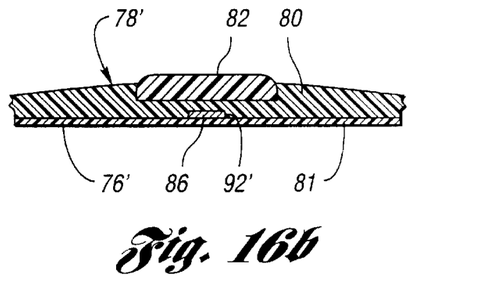
FIG. 16b is an alternate schematic illustration similar to that of FIG. 16a showing a second embodiment of the badge assembly of the emblem and badge main body portion of FIGS. 14–15, with the air bag cover substrate.

Badge 14 can also be an assembly, shown as badge assembly 78, 78' in FIGS. 16a and 16b, respectively. Badge assembly includes a main badge portion 80 (FIG. 14a–14b) and an emblem insert portion 82 (FIGS. 15a, 15b and 15c) attached to main body portion 80 (as illustrated in FIGS. 16a and 16b). As shown in FIGS. 14a and 14b, main body portion 80 includes a recessed portion 84 which receives emblem portion 82. Emblem portion 82 may be mounted or attached to main badge portion 80 in various ways. For example, with reference to FIG. 15b, emblem portion 82 includes a plurality of tabs 86, and preferably three tabs 86, extending from a rear surface 87 of the main emblem portion 88. Tabs 86 are inserted in corresponding apertures 90 formed in recessed portion 84 and extending between front and rear surfaces of recessed portion 84. Apertures 90 may be formed during the injection molding process or during a subsequent step following the injection molding process.

Tabs 86 are then bent against the rear surface 81 of main body portion 80 (and particularly the rear of surface 84 as illustrated in FIGS. 16a–16b). Bent tabs 86 press against the rear surface 81 of recessed portion 84 to create a substantially constant load on the elastomeric material of main body portion 80. In reaction to this constant load, the elastomeric material of main body portion 80 exerts an opposing reaction (spring-like force) which allows emblem 82 to be secured to main body portion 80. The entire rear surface 81 of main body portion 80 is preferably smooth so as to mate properly with the corresponding surface of the air bag cover substrate 76 to which it is attached. In a preferred embodiment, tabs 86 are bent inwardly toward a center of the recessed portion 84 as illustrated in FIG. 16a. Not only does this arrangement take up less space on the rear surface of the recessed portion 84, but it also allows emblem 82 to aid in creating a greater force exerted by the elastomeric material due to the sandwich effect of emblem 82 and tabs 86. Alternatively, tabs 86 could be bent outwardly away from the center of recessed portion 84.

Tabs 86 are preferably bent at least 90°, and up to approximately 110°, in order to create the constant load on the elastomeric material of main body portion 80. As shown in FIGS. 16b, in order to aid in aligning tabs 86 with rear surface 81 of recessed portion 84, recessed portion 84 may include a plurality of depressions 92 formed in rear surface 81 of main body portion 80. Depressions 92 correspond to the width and length of tabs 86 and are preferably as deep as at least the thickness of the tabs 86. The depressions extend away from the slots 90 and may have a downwardly extending slope to further aid in securing emblem 82 to main body portion 80. Depressions 92 also provide clearance for tabs 86 so that they do not interfere with air bag cover 76 during installation of badge 78. In the alternative shown in FIG. 16a, air bag cover substrate 76' may include recesses 92' for receiving corresponding tabs 86 during installation of badge 78', so that tabs 86 do not interfere with cover 76' during installation.

In the embodiment illustrated in FIGS. 14a–14c, main body portion 80 also includes a plurality of stake members 94 which are received by corresponding apertures in air bag cover 76 for locating badge 78 to cover 76, and also which may provide a means for heat staking badge 78 to cover 76.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. An air bag cover assembly for a motor vehicle comprising:
    a plastic substrate adapted to enclose an uninflated automotive air bag and a switch, the substrate having an outer surface and an inner surface, the outer surface having a recessed portion defining therebehind a switch location area; and
    a badge bonded to the substrate and including a relatively soft plastic preform compatible with the substrate and a foil top layer, the badge correspondingly shaped to be received in and secured to the recessed portion of the substrate and defining a switch interface for actuating the switch by applying pressure to the badge at it front outer surface.

2. The air bag cover of claim 1, wherein the preform has an relatively elongated shape.

3. The air bag cover of claim 1, wherein the preform has an unsymmetrical shape.

4. The air bag cover of claim 1, wherein the preform is non-annular in shape.

5. The air bag cover of claim 1, wherein preform and the foil top layer are compatible so that diffusion occurs therebetween.

6. The air bag cover of claim 5, wherein the top foil layer is a chrome layer.

7. The air bag cover of claim 1, further comprising a switch disposed behind the inner surface the of the badge, the switch being actuable by applying relatively low pressure to the badge outer surface.

8. The air bag cover of claim 1, wherein the decorative badge has at least one tab which extends through a corresponding slot in the substrate, the at least one tab having a bent portion pressing against the inner surface of the substrate so as to create a constant load on the substrate, wherein the substrate exerts an opposing reaction to the constant load thereby allowing the badge to be secured to the substrate.

9. The air bag cover of claim 1, wherein the bent portion of the at least one tab extends inwardly toward a center of the substrate.

10. An air bag cover assembly for a motor vehicle comprising:
    a plastic substrate adapted to enclose an uninflated automotive air bag and a switch, the substrate having an outer surface, an inner surface, and a tear seam formed in the surface of the substrate to allow the air bag to deploy, the outer surface having a recessed portion in a non-overlapping manner with the tear seam and defining therebehind a switch location area; and
    a badge bonded to the substrate and including a relatively soft plastic preform compatible with the substrate and a foil top layer, the badge correspondingly shaped to be received in and attached to the recessed portion of the substrate and defining a switch interface adapted to actuate the switch by applying pressure to the badge at its front outer surface.

11. A method for making an air bag cover having a decorative badge secured thereto, the method comprising:
    providing a film sheet;
    vacuum molding the film sheet in a mold cavity to obtain a relatively soft decorative preform;
    providing a hot stamping foil having a foil top layer and aligning the hot stamping foil with the preform in a hot stamping machine;
    operating the hot stamping machine for a time sufficient to generate a temperature and a pressure sufficient to melt and combine a top surface of the at least one foil-receiving portion and the preform of the hot stamping foil to form the decorative badge;
    injection molding a thermoplastic elastomeric body having a shape defining the air bag cover; and
    bonding the decorative badge to the air bag cover.

12. The method of claim 11, wherein injection molding includes placing the foil covered badge in an injection mold cavity having a shape defining the air bag cover;
    injecting a thermoplastic elastomer into the mold cavity to generate a substrate of the air bag cover wherein the generation of the substrate of the air bag cover creates sufficient pressure and heat to bond the substrate to the bottom surface of foil-covered badge.

13. The method of claim 11, wherein the badge has at least one tab projecting therefrom opposite the foil top layer, wherein bonding includes inserting the tab through a corresponding aperture in the air bag cover and bending the tab to secure the badge to the air bag cover.

14. An air bag cover assembly for a motor vehicle comprising:
    a plastic substrate adapted to enclose an uninflated air bag, the substrate having an outer surface having a recessed portion; and
    a badge assembly mounted to the substrate and received and mounted within the recessed portion of the outer surface of the substrate, the badge assembly having a main body portion and an insert portion, the main body portion having a front surface, a rear surface, and plurality of apertures extending between the front and rear surfaces, the insert portion having a plurality of tabs extending therefrom, each tab received by a corresponding aperture in the main body portion for mounting the insert thereto.

15. A method of making an air bag cover assembly having decorative badge secured thereto, the method comprising:
    providing a badge main body portion having a front surface, a rear surface and a plurality of apertures extending between the front and rear surfaces;

providing a badge insert portion having a plurality of tabs extending therefrom;

inserting the tabs of the badge insert into a corresponding aperture in the main body portion for mounting the insert thereto;

bending the tabs against the rear surface of the badge main body portion;

providing an air bag cover substrate adapted to enclose an uninflated air bag, the substrate having an outer surface; and mounting the badge main body portion to the outer surface of the substrate.

* * * * *